United States Patent
Ileogben

(10) Patent No.: US 9,194,728 B2
(45) Date of Patent: Nov. 24, 2015

(54) METHODS AND APPARATUSES FOR ADJUSTING THE OPENING OF A HOOD OF AN AIR FLOW MEASURING DEVICE

(76) Inventor: Pius Ileogben, Lawrenceville, GA (US)

( * ) Notice: Subject to any disclaimer, the term of this patent is extended or adjusted under 35 U.S.C. 154(b) by 1062 days.

(21) Appl. No.: 12/753,794

(22) Filed: Apr. 2, 2010

(65) Prior Publication Data

US 2011/0244781 A1    Oct. 6, 2011

(51) Int. Cl.
*F24F 11/02* (2006.01)
*G01F 1/00* (2006.01)

(52) U.S. Cl.
CPC ........................................ *G01F 1/00* (2013.01)

(58) Field of Classification Search
CPC ..................................................... F24F 11/02
USPC ........................................ 454/184, 187, 333
See application file for complete search history.

(56) References Cited

U.S. PATENT DOCUMENTS

| | | | | |
|---|---|---|---|---|
| 3,425,443 A | * | 2/1969 | Smith | 137/512.15 |
| 4,058,100 A | * | 11/1977 | Tanaka et al. | 123/457 |
| 4,754,651 A | * | 7/1988 | Shortridge et al. | 73/861.42 |
| 4,807,667 A | * | 2/1989 | Ohnhaus | 138/45 |
| 5,038,621 A | * | 8/1991 | Stupecky | 73/861.53 |
| 5,372,544 A | * | 12/1994 | Gervais | 454/256 |
| 6,361,433 B1 | * | 3/2002 | Gray | 454/358 |
| 7,690,598 B1 | * | 4/2010 | Plattner | 244/129.1 |
| 2002/0164943 A1 | * | 11/2002 | Misner | 454/164 |
| 2004/0074105 A1 | * | 4/2004 | Vagedes | 34/606 |
| 2006/0090890 A1 | * | 5/2006 | Klein et al. | 165/203 |
| 2006/0172692 A1 | * | 8/2006 | Moss et al. | 454/255 |
| 2007/0224866 A1 | * | 9/2007 | Clark et al. | 439/212 |
| 2007/0295338 A1 | * | 12/2007 | Loomas et al. | 128/207.18 |
| 2009/0047895 A1 | * | 2/2009 | Sanchez | 454/290 |
| 2009/0068940 A1 | * | 3/2009 | Bloemeling et al. | 454/162 |

OTHER PUBLICATIONS

Web page describing hoods for air flow measurement devices, http://www.aikencolon.com/Alnor-Balometers_c_1379.html.

* cited by examiner

*Primary Examiner* — Steven B McAllister
*Assistant Examiner* — Samantha Miller
(74) *Attorney, Agent, or Firm* — Baxam Law Group, LLC; Deanna L. Baxam

(57) ABSTRACT

Method and apparatuses for adjusting the dimensions of the opening of a hood of an air flow measuring device using flaps is provides. Flaps of various configurations and dimensions can be used to adjust the opening of hood to have numerous dimensions at various locations.

8 Claims, 10 Drawing Sheets

METHODS AND APPARATUSES FOR ADJUSTING THE OPENING OF A HOOD OF AN AIR FLOW MEASURING DEVICE

FIELD

The present invention relates to air flow measuring devices and more particularly to adjusting the dimensions of the opening of a hood of an air flow measuring device.

BACKGROUND

Referring to FIG. 1, an air flow measuring device 100 is used to measure air flow from registers, diffusers and grilles for various reasons such as, to verify air flow distribution, balance buildings, and pinpoint air system deficiencies. Air flow measuring device 100 generally includes a hood 110 and base 120. The hood 110 channels air to the base 120. The base 120 includes a measuring device for measuring the air flow and a readout device.

Air flow is measured using the air flow measuring device 100 by holding and aligning the top of hood 100 against an air flow opening and reading the airflow measurement on the readout device such a digital display. However, air flow openings, such as registers, diffusers, and grills, exist in a variety of sizes. To accurately measure the air flow from an air flow opening, the size of the opening of hood 110 should be as close as possible to the size of the air flow opening. Accordingly, although hood 110 is typically collapsible to fit into a carrying case, because hood 110 is of a fixed size, technicians must carry around numerous hoods of a variety of sizes to take readings for common air flow openings. To measure the air flow of a particular air flow opening, the technician must measure the air flow opening and then select, unfold, and place the correct sized hood 110 (if available) on the base 120 to measure the air flow. Carrying around multiple hoods 110 is bulk and costly, and replacing a hood 110 on a base 120 to match the size of an air flow opening is tedious and time consuming.

SUMMARY

Embodiments of the present invention include methods and apparatuses for adjusting the size of an opening of a hood of an air flow measuring device to measure air flow. Methods and apparatuses include placing a first material including at least one flap over an opening of a hood to conceal at least a portion of the opening of the hood and adjusting the at least one flap to create a new opening for the air flow measuring device. In another embodiment, a second material including at least one flap is placed over the first material and the at least one flap of the first material and the at least one flap of the second material are adjusted to create a new opening for the air flow measuring device.

Both the foregoing general description and the following detailed description are exemplary and explanatory only and are not restrictive of the invention as claimed.

DETAILED DESCRIPTION

Exemplary embodiments of the present invention adjust the size of the opening of a hood 110 based on the size of the air flow opening for which air flow measurements are to be taken. Embodiments of the present invention may reduce the number of hoods needed for air flow measurement or eliminate the need to have multiple hoods.

Figure 1:
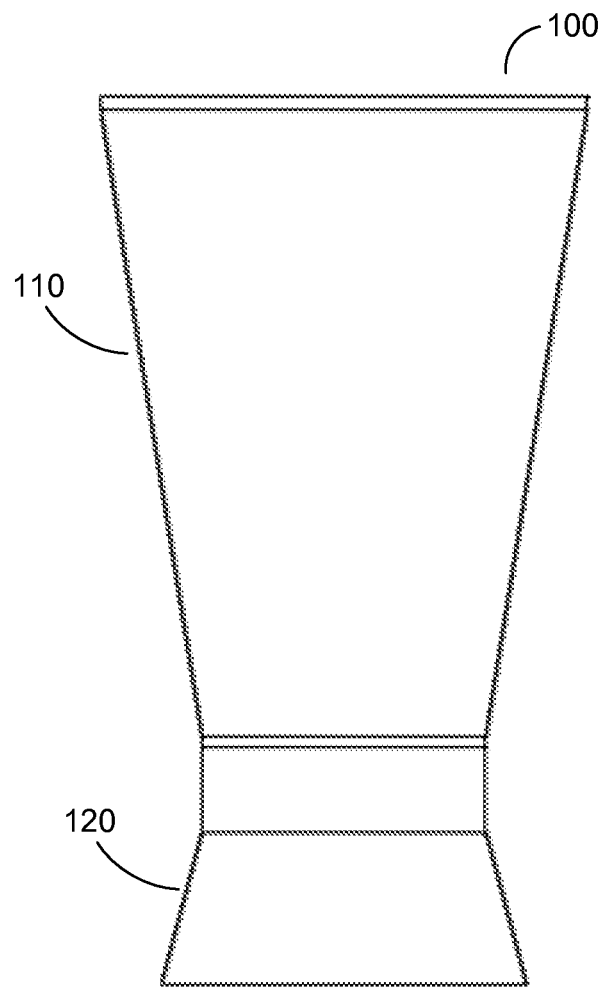
FIG. 1 illustrates a prior art air flow measuring device.
Figure 2A:
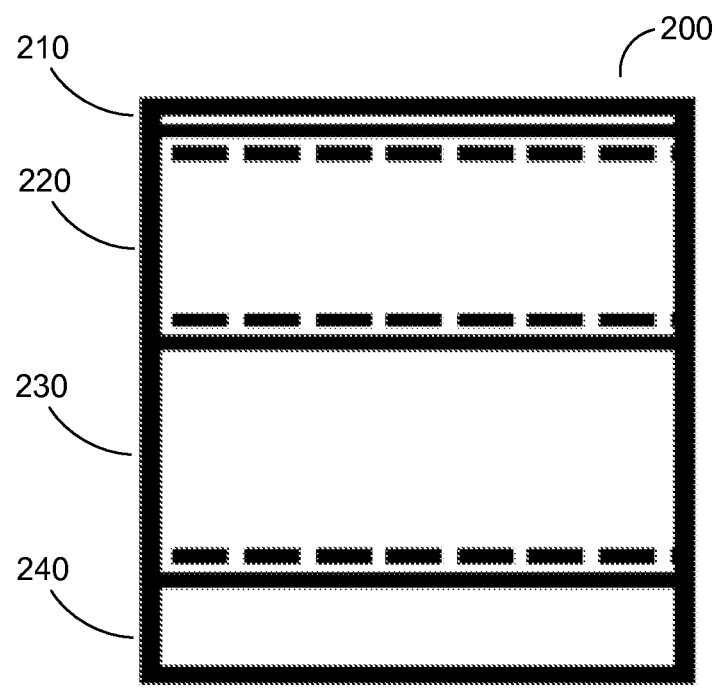
FIG. 2A illustrates a flap according to an exemplary embodiment of the present invention.

FIG. 2A illustrates a cover 200 according to an exemplary embodiment of the present invention. Cover 200 may include multiple flaps of varying widths, for example, flaps 210, 220, 230, and 240. In alternate embodiments, more or less flaps may be provided of the same or varying widths or combinations of thereof.

Flaps 210, 220, 230, 240 may include reclosable fasteners such as Velcro or any other fastening technology to secure flaps 210, 220, 230, 240 in an open or closed position. For example, referring to FIGS. 2B, 2C flap 220 may include Velcro hooks 250 on its underside to attach to Velcro loops 260 on flaps 210, 230 and flap 230 may include Velcro hooks 250 on its underside to attach to Velcro loops 260 on flap 240. In an alternate embodiment, the Velcro hooks and loops may be interchanged. However, reclosable fasteners may be arranged in numerous ways to secure flaps 210, 220, 230, 240 in an open or closed position.

Cover 200 may be attached to air flow measuring device 100 by any attachment means such as Velcro or any other attachment technology. In one embodiment, cover 200 may be attached to the hood 110 and can be flipped over the opening of air flow measuring device 100. Cover 200 may be detachable to or un-detachable from hold 110. One of ordinary skill in the art would know how to attach cover 200 to air flow measuring device 100.

Figure 2B:
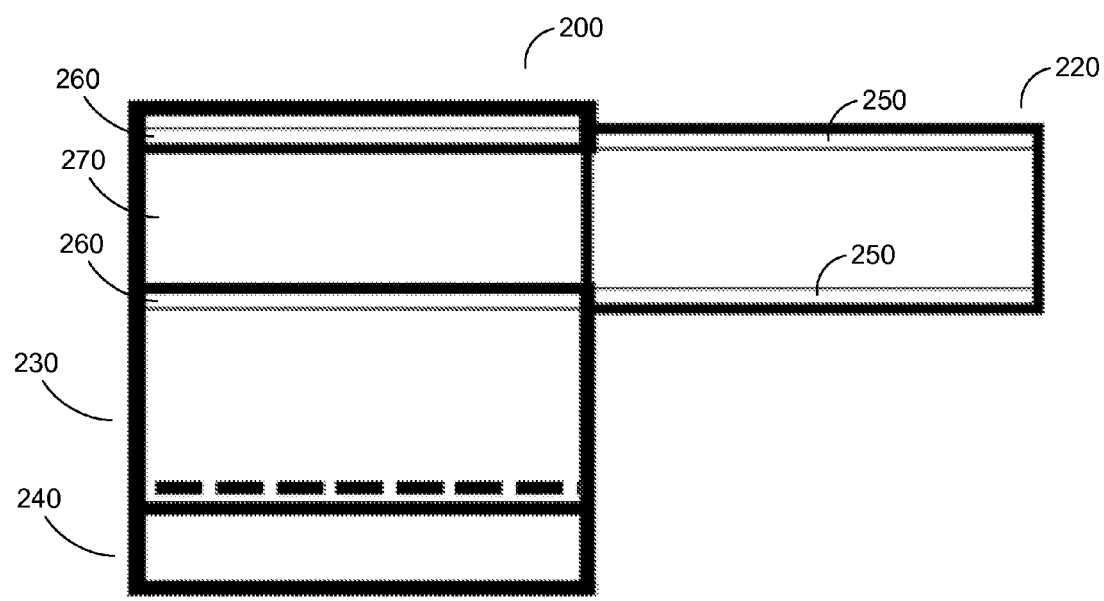
FIGS. 2B and 2C illustrate exemplary new openings of the hood of the air flow measuring device illustrated in FIG. 1 that can be achieved using the flap illustrated in FIG. 2A.
Figure 2C:
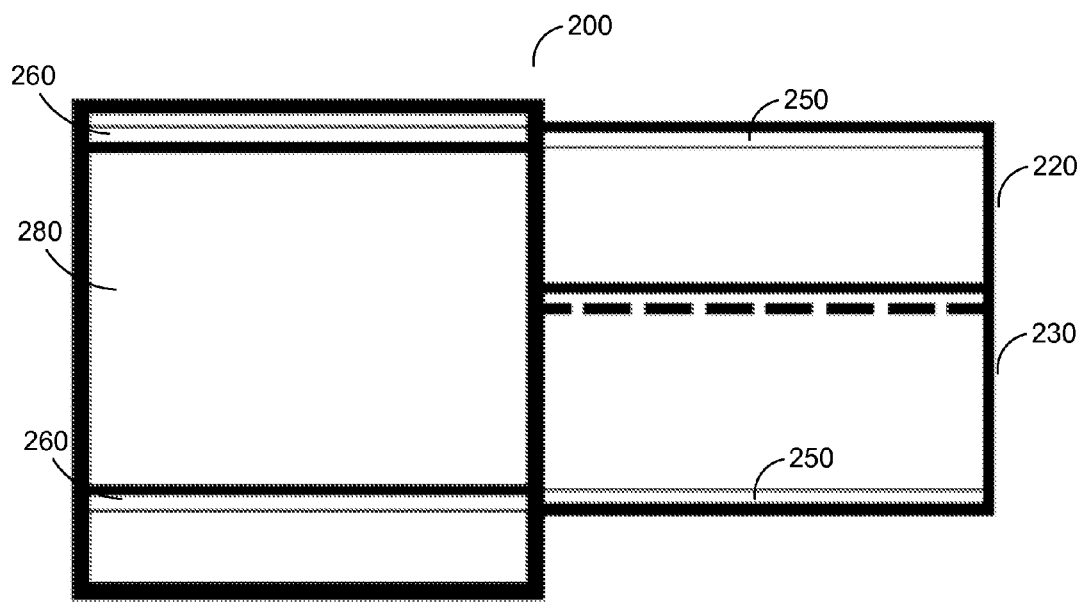

FIGS. 2B and 2C illustrate exemplary new openings of hood 110 that can be achieved using cover 200. For example, in an exemplary embodiment, cover 200 may have an overall dimension of 24"×24". To measure the airflow of an airflow opening measuring 24"×8", cover 200 is placed over the opening of hood 110 and then flap 220 is pulled back to reveal a 24"×8" opening 270 as shown in FIG. 2B. In an open position, flap 220 may drape down the side of air flow measuring device 100. To measure the airflow of an airflow opening measuring 24"×18", flaps 220 and 230 may be pulled back to reveal a 24"×18" opening 280, as shown in FIG. 2C.

Cover 200 may have any number of flaps with any dimensions to achieve any desired number of openings having any desired dimensions. One of ordinary skill in the art after reading this disclosure would know how to design a cover 200 to achieve a desire number of openings have desired dimensions.

Figure 3A:
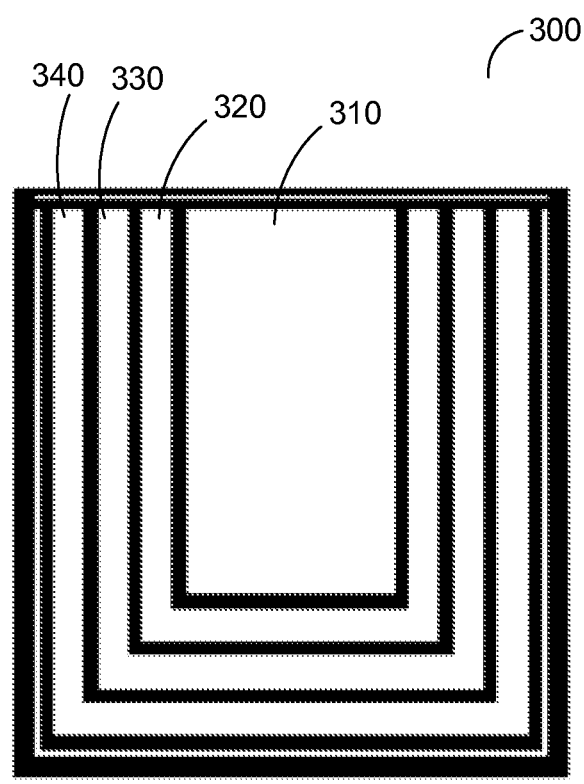
FIG. 3A illustrates a flap according to another exemplary embodiment of the present invention.

FIG. 3A illustrates a cover 300 according to another exemplary embodiment of the present invention. Cover 300 may include multiple layers of flaps of varying widths and lengths, where a flap may have an opening of a particular dimension. For example, referring to FIGS. 3A-E cover 300 may include flaps 310, 320, 330, 340 where flaps 320, 330, 340 may have openings 320', 330', 340' respectively. In an exemplary embodiment, cover 300 may have an overall dimension of 24"×24" where flap 320 has a 8"×8" opening 320'; flap 330 has a 12"×12" opening 330'; and flap 340 has a 16"×16" opening 340'. In alternate embodiments, more or less flaps may be provided, which may having openings of varying widths.

Flaps 310, 320, 330, 340 may include reclosable fasteners such as Velcro or any other fastening technology to secure flaps 310, 320, 330, 340 in an open or closed position. For example, referring to FIG. 3B, flap 310 may include Velcro hooks 350 on its underside to attach to Velcro loops 360 on flap 320. Similarly, flaps 320, 330, 340 also may include Velcro hooks and loops to secure the flaps, as shown in FIGS. 3C-3E. In an alternate embodiment, the Velcro hooks and loops may be interchanged. However, reclosable fasteners may be arranged in numerous ways to secure flaps 310, 320, 330, 340 in an open or closed position.

Cover 300 may be attached to air flow measuring device 100 by any attachment means such as Velcro or any other attachment technology. In one embodiment, cover 300 may be attached to the hood 110 and can be flipped over the opening of air flow measuring device 100. Cover 300 may be detachable to or un-detachable from hold 110. One of ordinary skill in the art would know how to attach cover 300 to air flow measuring device 100.

Figure 3B:
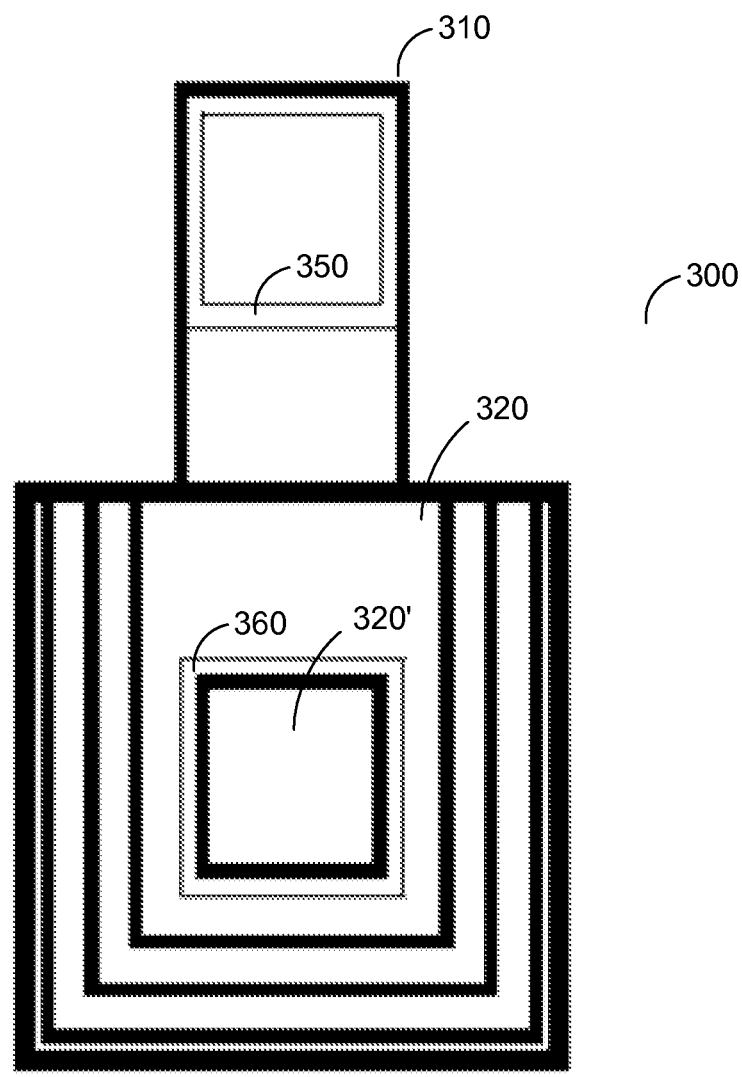
FIGS. 3B-3E illustrate exemplary new openings of the hood of the air flow measuring device illustrated in FIG. 1 that can be achieved using the flap illustrated in FIG. 3A.
Figure 3C:
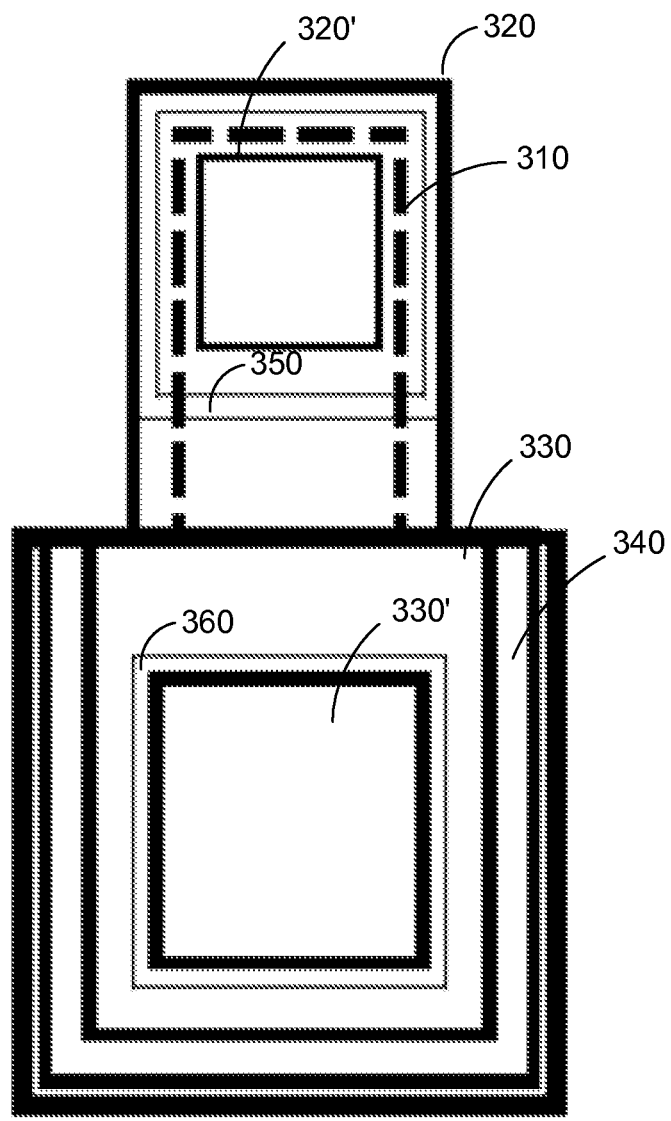
Figure 3D:
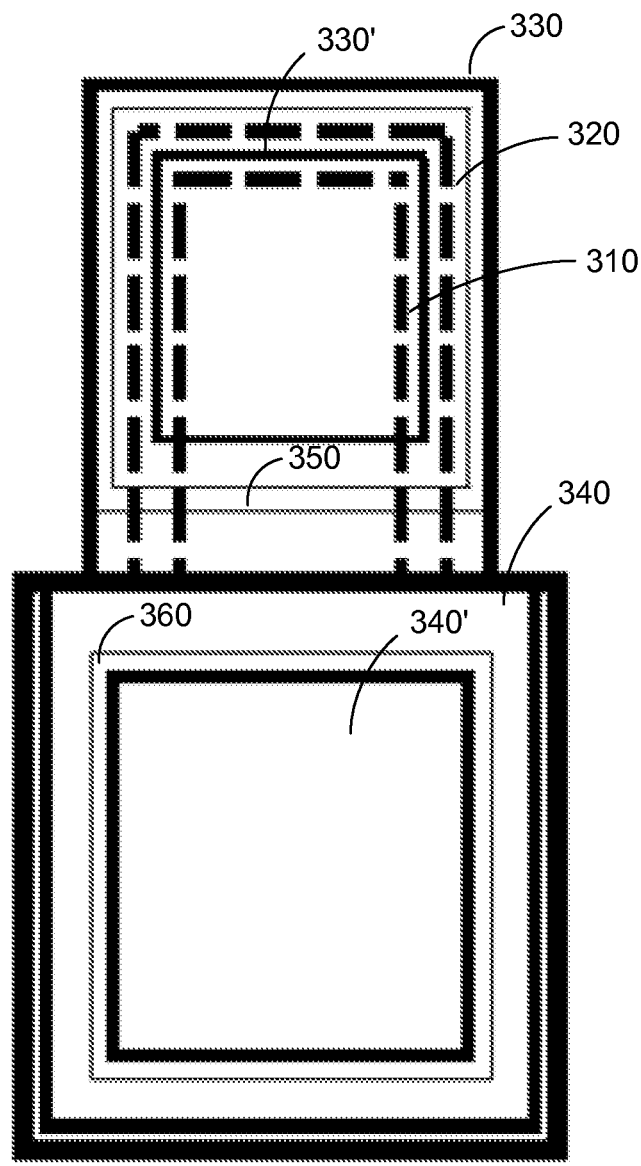
Figure 3E:
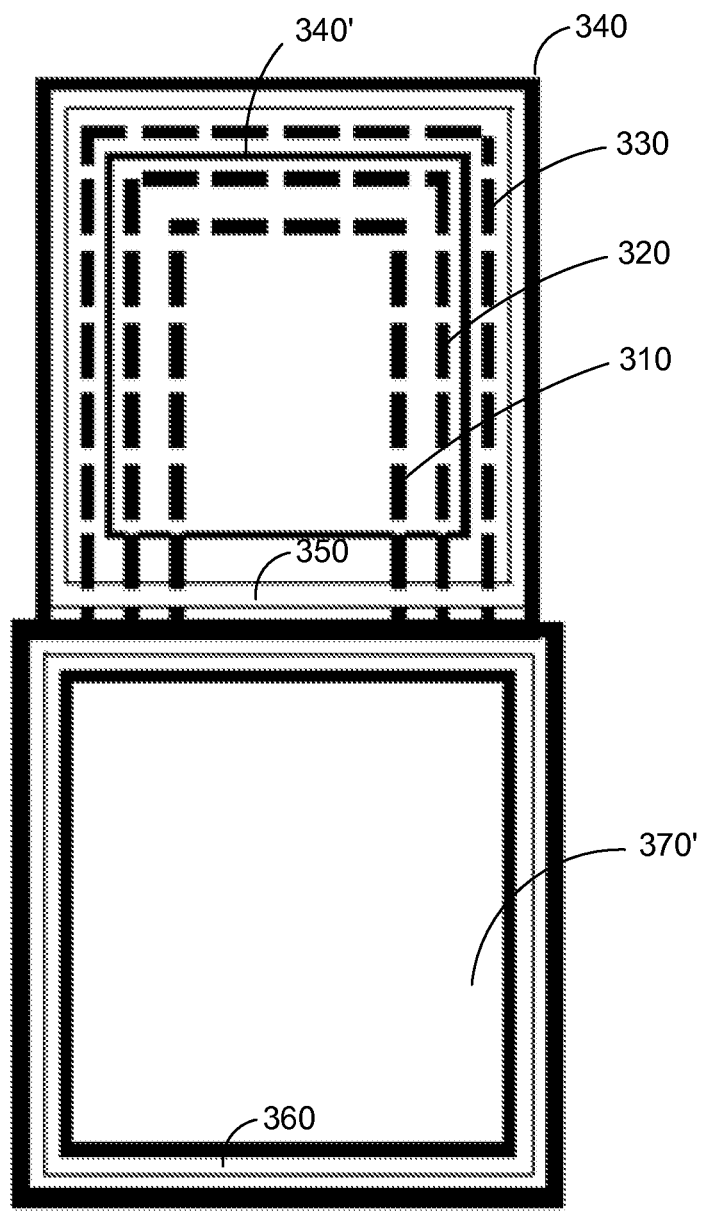

FIGS. 3B-3E illustrates exemplary new openings of hood 110 that can be achieved using cover 300. For example, to measure the airflow of an airflow opening measuring 8"×8", cover 300 is placed over the opening of hood 110 and then flap 310 is pulled back to reveal a 8"×8" opening 320', as shown in FIG. 3B. In an open position, flap 310 may drape down the side of air flow measuring device 100. To measure the airflow of an airflow opening measuring 12"×12", flap 320 is pulled back to reveal a 12"×12" opening 330', as shown in FIG. 3C. To measure the airflow of an airflow opening measuring 16"×16", flap 330 is pulled back to reveal a 12"×12" opening 340', as shown in FIG. 3D. To measure the airflow of an airflow opening measuring 20"×20", flap 340 is pulled back to reveal a 20"×20" opening 370', as shown in FIG. 3E.

Cover 300 may have any number of flaps with openings having any dimensions to achieve any desired number of openings having any desired dimensions. One of ordinary skill in the art after reading this disclosure would know how to design a cover 300 to achieve a desired number of openings have desired dimensions.

Figure 4:
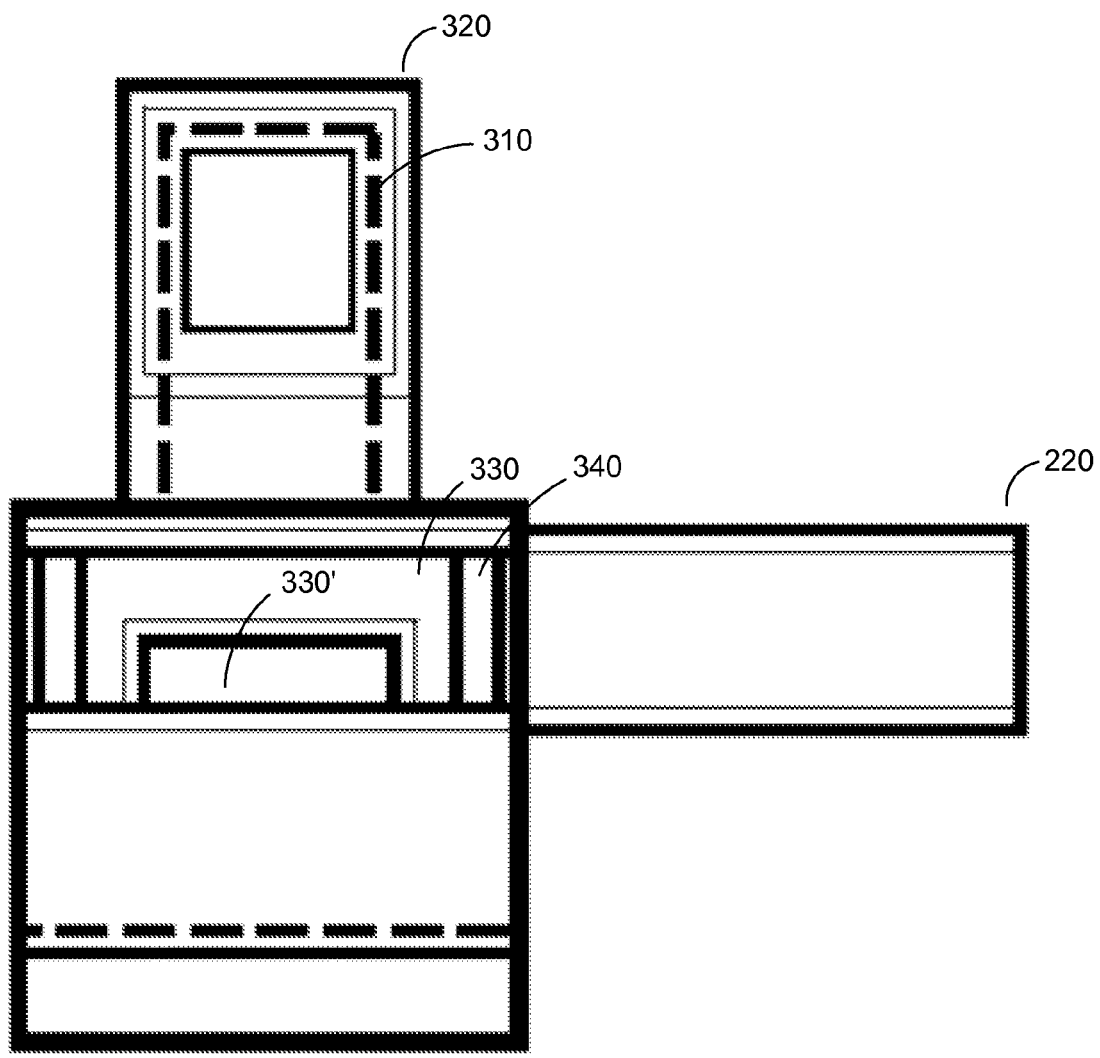
FIG. 4 illustrates an exemplary new opening of the hood of the air flow measuring device illustrated in FIG. 1 that can be achieved using the flaps illustrated in FIGS. 2A and 3A.

In another exemplary embodiment, cover 200 and cover 300 are used together to adjust the dimensions of the opening of hood 110. FIG. 4 illustrates an exemplary new opening of hood 110 that can be achieved using covers 200, 300. For example, cover 300 may be placed over the opening of hold 110 and then flaps 310, 320 are pulled back to reveal a 12"×12" opening 330'. Flaps 310, 320 may drape down the side of air flow measuring device 100. Then, to achieve a new opening that may have different dimensions than the dimensions that may be achieved with either cover 200 or 300 alone, cover 200 is placed over top cover 300 and flap 220 may be pulled back, for example, to reveal a portion of opening 330' with flaps 230, 340 concealing a portion of opening 330.

The combinations of covers 200, 300 may be used to adjust the opening of hood 110 to have numerous dimensions at various locations.

Covers 200, 300 may be made of any appropriate material to measure airflow. In one embodiment, covers 200, 300 are made of the same material of which hood 110 is made. One of ordinary skill in the art would know which material to use to make flaps 200, 300.

Many modifications and other embodiments of the invention will come to mind to one skilled in the art to which this invention pertains having the benefit of the teachings presented in the forgoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Reference throughout this specification to "an embodiment" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Furthermore, the described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

What is claimed:

1. A method for adjusting the size of an opening of a hood of an HVAC air flow measuring device to measure air flow, the method comprising:
   a) attaching a first cover over the opening of a hood of an air flow measuring device to conceal at least a portion of the opening of the hood;
   b) measuring the size of an air flow opening;
   c) determining the number of an at least one first flap to pull back over a first hinge on the first cover in a first direction to reveal a first new opening based on the size of the air flow opening;
   d) attaching a second cover over the opening of the hood;
   e) determining a number of an at least one second flap to pull back over a second hinge on the second cover in a second direction different from the first direction to reveal a second new opening based on the size of the air flow opening;
   f) pulling back the at least one first flap from a reclosable fastener and the at least one second flap from a reclosable fastener; and
   g) placing the hood over the air flow opening to measure air flow.

2. The method of claim 1 wherein the reclosable fastener is hook and loop fastener tape.

3. The apparatus of claim 1 wherein the dimensions of the first opening are different from the dimensions of the second opening.

4. The method of claim 2 wherein the at least one first flap and the at least one second flap are attached to the first cover and second cover, respectively, by reclosable hook and loop fastener tape.

5. An apparatus for providing adjusted dimensions of a hood opening of an HVAC air flow measuring device comprising: a hood of an HVAC air flow measuring device; and further comprising:
   a) a first cover comprising at least one first flap, and
   b) a second cover comprising at least one second flap;
   wherein the at least one first flap and the at least one second flap are secured one to the other and attached to and over the opening of the hood of the air flow measuring device to reveal a first new opening having a first overall dimension when the at least one first flap is pulled back, and to reveal a second new opening having a second overall dimension when the at least one second flap is pulled back;

and further wherein the at least one first flap is pulled back over a first hinge in a first direction on the first cover and the at least one second flap is pulled back over a second hinge in a second direction on the second cover;

the first direction is different from the second direction; and the first cover and the second cover are fully detachable or may be attached together as needed to adjust overall the dimensions of the resulting first and second new openings over the hood of the air flow measuring device.

6. The apparatus of claim 5 wherein the dimensions of the first opening and of the second opening are different.

7. The apparatus of claim 5 wherein the at least one first flap and the at least one second flap are selected from multiple layers of flaps of varying widths and lengths, wherein said flaps, when pulled back over the opening of the hood, provide openings of varying widths and lengths.

8. The apparatus of claim 5 wherein the first cover and the at least one first flap and the second cover and the at least one second flap are made from different materials.

\* \* \* \* \*